US008731164B1

(12) United States Patent
Croak et al.

(10) Patent No.: US 8,731,164 B1
(45) Date of Patent: May 20, 2014

(54) METHOD AND APPARATUS FOR PROMOTING ENHANCED SERVICE OPTIONS IN COMMUNICATION NETWORKS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1656 days.

(21) Appl. No.: 11/135,735

(22) Filed: May 24, 2005

(51) Int. Cl.
 *H04M 3/42* (2006.01)
(52) U.S. Cl.
 USPC .................................. 379/201.01; 455/414.1
(58) Field of Classification Search
 USPC ........ 379/111, 112.06, 201.01; 370/235, 352, 370/431; 455/415, 432.3, 433, 410, 405, 455/414.1; 235/380; 705/10
 See application file for complete search history.

(56) References Cited

U.S. PATENT DOCUMENTS

| | | | | |
|---|---|---|---|---|
| 5,528,676 A | * | 6/1996 | Sussell et al. ................. | 379/111 |
| 5,732,128 A | * | 3/1998 | Bushnell ....................... | 379/119 |
| 6,301,471 B1 | * | 10/2001 | Dahm et al. .................. | 455/405 |
| 7,043,241 B1 | * | 5/2006 | Sladek et al. ............... | 455/432.3 |
| 7,360,690 B1 | * | 4/2008 | Ahuna et al. ................. | 235/380 |
| 2002/0078151 A1 | * | 6/2002 | Wickam et al. .............. | 709/204 |
| 2002/0138603 A1 | * | 9/2002 | Robohm ....................... | 709/223 |
| 2003/0072319 A1 | * | 4/2003 | Pedersen ....................... | 370/431 |
| 2004/0091093 A1 | * | 5/2004 | Bookstaff ................ | 379/201.01 |
| 2004/0180655 A1 | * | 9/2004 | Jang et al. ..................... | 455/433 |
| 2005/0020252 A1 | * | 1/2005 | Yang et al. .................... | 455/415 |
| 2005/0105467 A1 | * | 5/2005 | True et al. ..................... | 370/235 |
| 2005/0220280 A1 | * | 10/2005 | Steinberg ................... | 379/93.12 |
| 2006/0067493 A1 | * | 3/2006 | Cole et al. ..................... | 379/111 |
| 2006/0167746 A1 | * | 7/2006 | Zucker ............................ | 705/14 |
| 2006/0223495 A1 | * | 10/2006 | Cassett et al. ................ | 455/405 |
| 2006/0223496 A1 | * | 10/2006 | Benco et al. .................. | 455/410 |
| 2008/0027785 A1 | * | 1/2008 | Mechaley et al. .............. | 705/10 |

* cited by examiner

Primary Examiner — Sonia Gay

(57) ABSTRACT

A method and apparatus for enabling packet network service providers, e.g., a VoIP network service providers, to collect information on the feature usage of their subscribers and spontaneously offer them the opportunity to subscribe to enhanced service features based on their existing feature usage patterns is disclosed. For example, users who accumulate a lot of voice mail can be offered a locate me feature, those who frequently use Do-Not-Disturb features can be offered an instant messaging application, and those who engage in three way conference calls can be offered a personal conferencing service that provides up to 10 conference legs.

10 Claims, 4 Drawing Sheets

METHOD AND APPARATUS FOR PROMOTING ENHANCED SERVICE OPTIONS IN COMMUNICATION NETWORKS

The present invention relates generally to communication networks and, more particularly, to a method and apparatus for promoting enhanced service options in communications networks, e.g., packet networks such as Voice over Internet Protocol (VoIP) networks.

BACKGROUND OF THE INVENTION

Residential users of packet network services, e.g., VoIP network services, often use enhanced service features that provide them with greater control over their telephony services. Some of these features are embedded within the flat rate charged by the network providers, and others are offered on a pay per use or on a monthly recurring charge basis. Often these pay per use or monthly recurring charge based enhanced service options are profitable components of a VoIP offer set. Different subscribers have different needs for different enhanced service options. For instance, one user may make frequent 3-way calls while another often uses the Do-Not-Disturb feature. If the enhanced service option needs can be understood by the network provider, the network provider can more effectively offer relevant and appropriate enhanced service features to individual subscribers.

Therefore, a need exists for a method and apparatus for promoting enhanced service options in a packet network, e.g., a VoIP network.

SUMMARY OF THE INVENTION

In one embodiment, the present invention enables VoIP network service providers to collect information on the feature usage of their subscribers and spontaneously offer them the opportunity to subscribe to enhanced service features based on their existing feature usage patterns. For example, users who accumulate a lot of voice mail can be offered a locate me feature, those who frequently use Do-Not-Disturb features can be offered an instant messaging application, and those who engage in three way conference calls can be offered a personal conferencing service that provides up to 10 conference legs. The locate me service feature allows the subscriber to register multiple phone numbers to which that the subscriber can be reached. When the locate me service feature is enabled, the network will process incoming calls to the subscriber's number by ringing those registered phone numbers sequentially or simultaneously to try to locate the subscriber. The Do-Not-Disturb service feature allows the subscriber to not receive phone calls during a specified period of time and redirect all calls to the subscriber's voicemail box.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
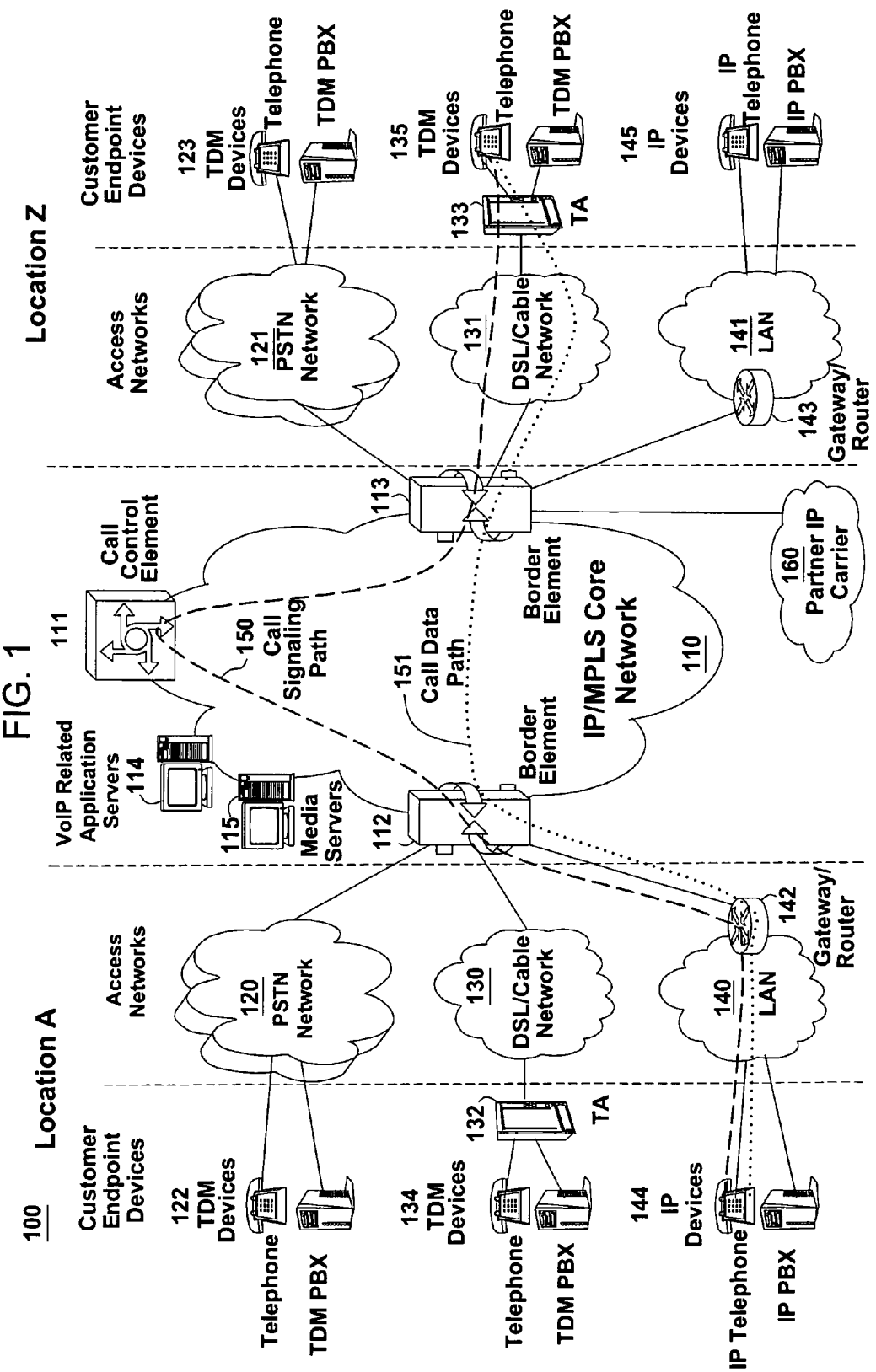
FIG. 1 illustrates an exemplary packet network, e.g., a Voice over Internet Protocol (VoIP) network, related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Residential users of packet network services, e.g., VoIP network services, often use enhanced service features that provide them with greater control over their telephony services. Some of these features are embedded within the flat rate charged by the network providers, and others are offered on a pay per use or on a monthly recurring charge basis. Often these pay per use or monthly recurring charge based enhanced service options are profitable components of a VoIP offer set. Different subscribers have different needs for different enhanced service options. For instance, one user may make frequent 3-way calls while another often uses the Do-Not-Disturb feature. If the enhanced service option needs can be understood by the network provider, the network provider can more effectively offer relevant and appropriate enhanced service features to individual subscribers.

To address this need, the present invention enables VoIP network service providers to collect information on the feature usage of their subscribers and spontaneously offer them the opportunity to subscribe to enhanced service features based on their existing feature usage patterns. For example, users who accumulate a lot of voice mail can be offered a locate me feature, those who frequently use Do-Not-Disturb features can be offered an instant messaging application, and those who engage in three way conference calls can be offered a personal conferencing service that provides up to 10 conference legs. The locate me service feature allows the subscriber to register multiple phone numbers to which that the subscriber can be reached. When the locate me service feature is enabled, the network will process incoming calls to the subscriber's number by ringing those registered phone numbers sequentially or simultaneously to try to locate the subscriber. The Do-Not-Disturb service feature allows the subscriber to not receive phone calls during a specified period of time and redirect all calls to the subscriber's voicemail box.

Figure 2:
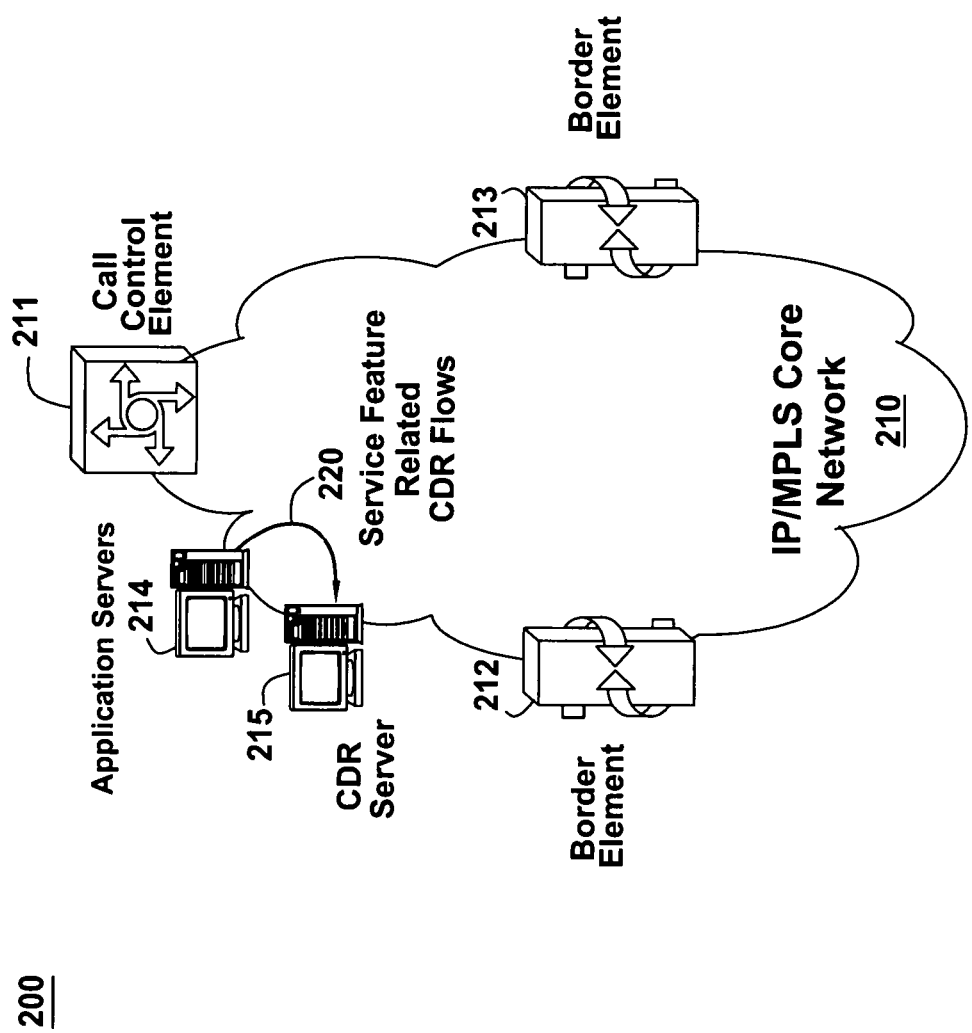
FIG. 2 illustrates an example of collecting service feature associated Call Detail Records related to the present invention.

FIG. 2 illustrates an example of collecting service feature associated Call Detail Records (CDRs) related to the present invention. CDR is data associated with a telephone call, including the calling and the called numbers, the date and timestamp, the duration, the call setup delay, the final handling code, along with other performance related data, such as packet lost and delay etc, of the telephone call. In FIG. 2, service feature related CDRs are collected from AS 214 using flow 220 within a packet network 210, e.g., a VoIP network. Network elements that generate CDRs include, but are not limited to, CCE 211, BEs 212-213, and ASs 214. A special server, CDR server 215, collects all the CDRs generated within the VoIP network and processes these CDRs accordingly. CDRs generated by AS 214 are particularly related to service feature usage associated with a phone call. Using service feature related CDRs associated with phone calls made by a subscriber, service feature usage patterns of the subscriber can be constructed. Service usage patterns include service feature used for both incoming calls destined to the subscriber and outgoing calls made by the subscriber. Once the service feature usage patterns have been constructed, the relevant and appropriate enhanced service feature promotions can be offered to the subscriber to help capture additional revenue streams by the network provider.

Figure 3:
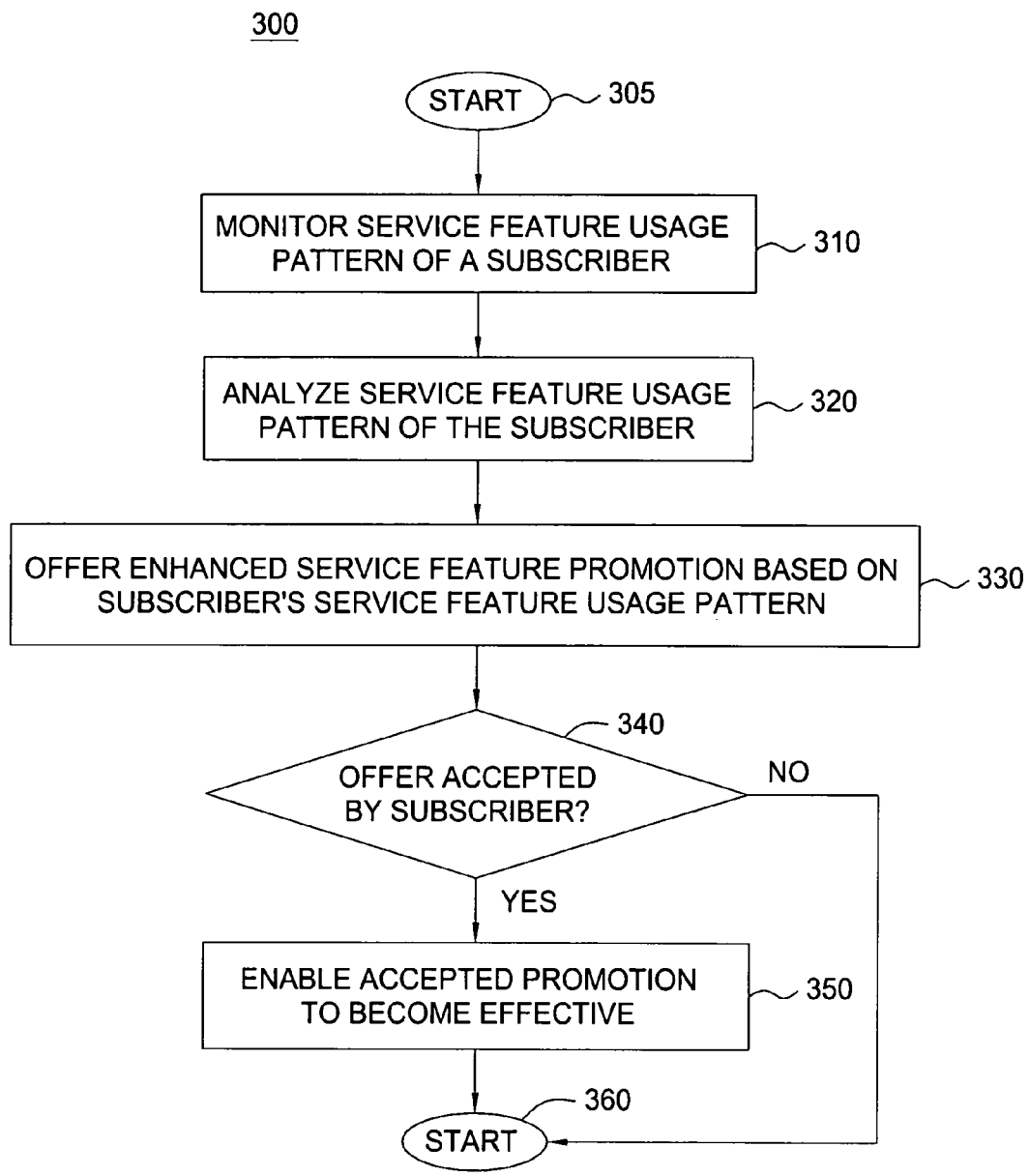
FIG. 3 illustrates a flowchart of a method for promoting enhanced service options in a packet network, e.g., a VoIP network, of the present invention.

FIG. 3 illustrates a flowchart of a method 300 for promoting enhanced service options in a packet network, e.g., a VoIP network. Method 300 starts in step 305 and proceeds to step 310.

In step 310, the method 300 monitors service feature usage of a subscriber using information contained in service feature related CDRs generated by the AS. The monitoring function may comprise the tracking and storing of information pertaining to feature usage by the subscribers, e.g., the features that are used, the frequency of such feature usage, the duration of each feature use, and so on.

In step 320, the method 300 analyzes the service feature usage patterns of the subscriber using information contained in service feature related CDRs. Service feature usage patterns include service feature frequently used for both incoming calls destined to the subscriber and outgoing calls made by the subscriber. In step 330, the method 300 offers special promotions based on the subscriber's service feature usage patterns. For instance, users who accumulate a lot of voice mail can be offered a locate me feature, those who frequently use Do-Not-Disturb features can be offered an instant messaging application, and those who engage in three way conferences can be offered a personal conferencing service that provides up to 10 conference legs. Promotion offers can be sent to the subscriber via a regular mail message, an email message, a voicemail message, or a phone call by a customer sales agent. In step 340, the method 300 checks if the offer is accepted by the subscriber. If the offer is accepted, the method proceeds to step 350; otherwise, the method proceeds to step 360. In step 350, the method activates the accepted promotional offer immediately. This entails updating one or more billing functions related to the subscriber's account to ensure the subscriber receives the correct billing of the enhanced service feature options accepted or configuring the network functions that need to support the promotional enhanced service features. For instance, if the subscriber signs up for the instant messaging, the billing related to the instant messaging service feature must be updated accordingly. If the subscriber signs up for the enhanced conference call service feature, the network must be configured appropriately to accept and support conference calls originated by the subscriber with up to 10 conference call legs. The method ends in step 360.

In one embodiment, the updating and configuring functions can be performed automatically by the packet network, if the promotion is accepted electronically by the subscriber. For example, the subscriber can be provided with an electronic link, e.g., in an email, for accepting and entering the necessary information to activate the new service and/or billing plan in the offered promotion. In this manner, interaction with customer sales agents can be minimized.

Figure 4:
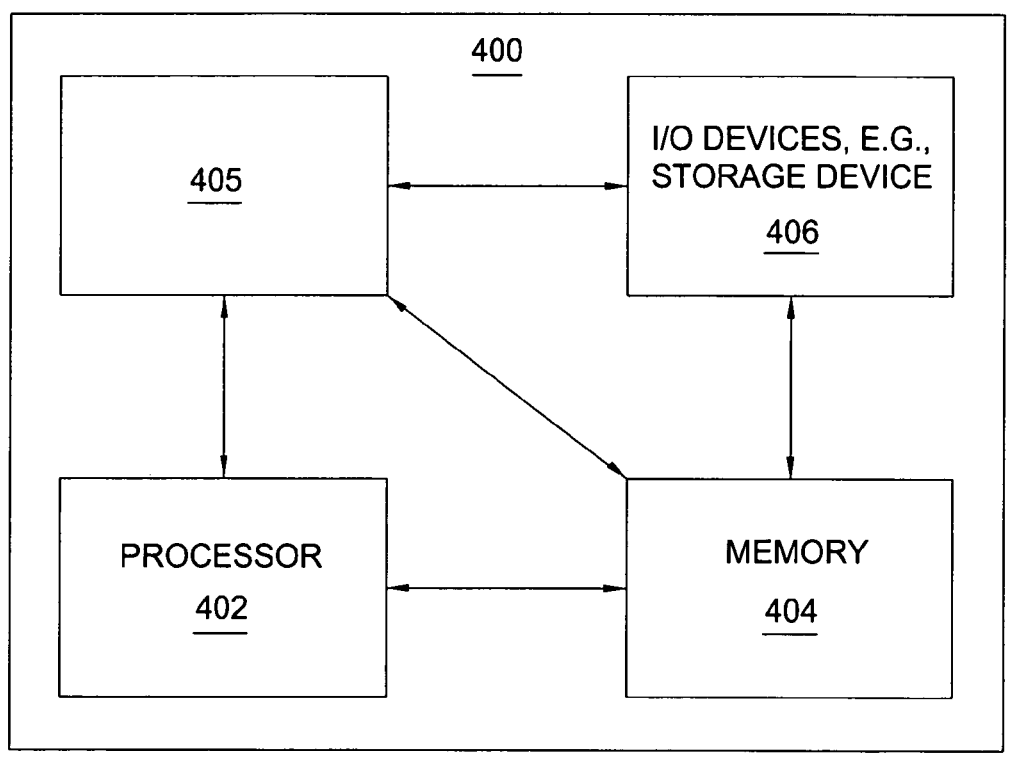
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an enhanced service promotion module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present enhanced service promotion module or process 405 can be loaded into memory 404 and executed by processor 402 to implement the functions as discussed above. As such, the present promoting enhanced service options process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for promoting a service option in a packet network, comprising:

monitoring, by a processor, a service feature usage pattern of a subscriber, wherein the service feature usage pattern comprises a service feature usage pattern of a voicemail service for incoming calls destined to the subscriber;

analyzing, by the processor, the service feature usage pattern for determining the service option;

offering, by the processor, the service option based on the service feature usage pattern to the subscriber, wherein the service option comprises a locate me service feature option, wherein the locate me service feature option registers multiple phone numbers to which the subscriber can be reached, wherein the offering comprises sending an offer for the locate me service feature option to the subscriber via an email message when the subscriber exceeds a frequency of usage of the voicemail service, wherein the email message includes an electronic link for accepting the offer and entering information that is necessary for activating the service option;

updating, by the processor, a billing function related to an account of the subscriber when the offer for the service option is accepted by the subscriber; and configuring, by the processor, a network function for supporting the service option when the offer for the service option is accepted by the subscriber, wherein the updating and configuring are performed automatically when the offer for the service option is accepted via the electronic link.

2. The method of claim 1, wherein the packet network is an internet protocol network.

3. The method of claim 1, wherein the service feature usage pattern is monitored and analyzed using call detail records associated with individual phone calls involving the subscriber.

4. The method of claim 3, wherein the call detail records are collected from an application server.

5. A non-transitory computer-readable medium storing instructions which, when executed by a processor, cause the processor to perform operations for promoting a service option in a packet network, the operations comprising:

monitoring a service feature usage pattern of a subscriber, wherein the service feature usage pattern comprises a service feature usage pattern of a voicemail service for incoming calls destined to the subscriber;

analyzing the service feature usage pattern for determining the service option;

offering the service option based on the service feature usage pattern to the subscriber, wherein the service option comprises a locate me service feature option, wherein the locate me service feature option registers multiple phone numbers to which the subscriber can be reached, wherein the offering comprises sending an offer for the locate me service feature option to the subscriber via an email message when the subscriber exceeds a frequency of usage of the voicemail service, wherein the email message includes an electronic link for accepting the offer and entering information that is necessary for activating the service option;

updating a billing function related to an account of the subscriber when the offer for the service option is accepted by the subscriber; and configuring a network function for supporting the service option when the offer for the service option is accepted by the subscriber, wherein the updating and configuring are performed automatically when the offer for the service option is accepted via the electronic link.

6. The non-transitory computer-readable medium of claim 5, wherein the packet network is an Internet protocol network.

7. The non-transitory computer-readable medium of claim 5, wherein the service feature usage pattern is monitored and analyzed using call detail records associated with individual phone calls involving the subscriber.

8. The non-transitory computer-readable medium of claim 7, wherein the call detail records are collected from an application server.

9. An apparatus for promoting a service option in a packet network, comprising:

a processor; and a computer-readable medium storing instructions which, when executed by the processor, cause the processor to perform operations, the operations comprising:

monitoring a service feature usage pattern of a subscriber, wherein the service feature usage pattern comprises a service feature usage pattern of a voicemail service for incoming calls destined to the subscriber;

analyzing the service feature usage pattern for determining the service option;

offering the service option based on the service feature usage pattern to the subscriber, wherein the service option comprises a locate me service feature option, wherein the locate me service feature option registers multiple phone numbers to which the subscriber can be reached, wherein the offering comprises sending an offer for the locate me service feature option to the subscriber via an email message when the subscriber exceeds a frequency of usage of the voicemail service, wherein the email message includes an electronic link for accepting the offer and entering information that is necessary for activating the service option;

updating a billing function related to an account of the subscriber when the offer for the service option is accepted by the subscriber; and configuring a network function for supporting the service option when the offer for the service option is accepted by the subscriber, wherein the updating and configuring are performed automatically when the offer for the service option is accepted via the electronic link.

10. The apparatus of claim 9, wherein the packet network is an internet protocol network.

\* \* \* \* \*